United States Patent
Gaussen et al.

(10) Patent No.: US 11,445,046 B2
(45) Date of Patent: Sep. 13, 2022

(54) METHOD FOR DISTRIBUTING A CONTENT IN A CONTENT DISTRIBUTION NETWORK, ENTITY OF ORIGIN AND CORRESPONDING DISTRIBUTION ENTITIES

(71) Applicant: ORANGE, Issy-les-Moulineaux (FR)

(72) Inventors: Benoit Gaussen, Chatillon (FR); Glenn Feunteun, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/955,458

(22) PCT Filed: Dec. 17, 2018

(86) PCT No.: PCT/FR2018/053330
§ 371 (c)(1),
(2) Date: Jun. 18, 2020

(87) PCT Pub. No.: WO2019/122652
PCT Pub. Date: Jun. 27, 2019

(65) Prior Publication Data
US 2020/0358881 A1   Nov. 12, 2020

(30) Foreign Application Priority Data
Dec. 20, 2017 (FR) ...................................... 1762631

(51) Int. Cl.
*H04L 67/63*   (2022.01)
*H04L 67/563*  (2022.01)
(Continued)

(52) U.S. Cl.
CPC ............ *H04L 67/63* (2022.05); *H04L 63/083* (2013.01); *H04L 67/563* (2022.05); *H04L 67/568* (2022.05)

(58) Field of Classification Search
CPC ............. H04L 67/1002; H04L 67/2842; H04L 29/08729; H04L 29/08801; H04L 69/22;
(Continued)

(56) References Cited

U.S. PATENT DOCUMENTS 7,240,100 B1 * 7/2007 Wein ........................ H04L 63/08
                                                    709/214
9,118,680 B1 * 8/2015 Dunlap ................... H04L 65/80
(Continued)

OTHER PUBLICATIONS

English translation of the Written Opinion of the International Searching Authority dated Jun. 23, 2020 for corresponding International Application No. PCT/FR2018/053330, filed Dec. 17, 2018.
(Continued)

*Primary Examiner* — Tonia L Dollinger
*Assistant Examiner* — Linh T. Nguyen
(74) *Attorney, Agent, or Firm* — David D. Brush; Westman, Champlin & Koehler, P.A.

(57) ABSTRACT

In order to distribute content made available by an entity of origin, a first distribution entity receives a request to access the content by a client entity. If this is a first access request received by the first distribution entity for the content, the distribution entity acts as a proxy: it receives, from the entity of origin or from a second distribution entity, and retransmits to the client entity, a response including the content, and it stores the content in a cache. In addition, it transmits, to the entity of origin or to the second distribution entity, a context request, receives in return a response including a description of the execution context of the access request, and stores the description. Otherwise, the first distribution entity uses the previously stored description in order to perform an execution of the later access request.

14 Claims, 5 Drawing Sheets

(51) Int. Cl.
*H04L 67/568* (2022.01)
*H04L 9/40* (2022.01)

(58) Field of Classification Search
CPC ... H04L 63/083; H04L 67/327; H04L 63/102; H04L 67/16; H04L 65/1073; H04W 4/70; H04W 4/38; H04W 72/005; G06F 16/24
See application file for complete search history.

(56) References Cited

U.S. PATENT DOCUMENTS

| | | | |
|---|---|---|---|
| 10,476,940 B2* | 11/2019 | Ajitomi | H04L 67/10 |
| 10,754,701 B1* | 8/2020 | Wagner | G06F 9/5077 |
| 10,831,549 B1* | 11/2020 | Radhakrishnan | G06F 9/5044 |
| 2003/0018714 A1* | 1/2003 | Mikhailov | H04L 67/2842 |
| 2007/0050491 A1* | 3/2007 | Kataoka | H04L 67/288 |
| | | | 709/223 |
| 2007/0208737 A1* | 9/2007 | Li | H04L 67/18 |
| 2008/0243996 A1 | 10/2008 | Wu et al. | |
| 2011/0082982 A1* | 4/2011 | Harvell | H04L 67/2842 |
| | | | 711/122 |
| 2013/0159383 A1* | 6/2013 | Tuliani | G06F 15/16 |
| | | | 709/203 |
| 2014/0006566 A1 | 1/2014 | Serenyi et al. | |
| 2014/0280677 A1* | 9/2014 | Altman | G06F 16/9574 |
| | | | 709/213 |
| 2016/0065576 A1* | 3/2016 | Zhang | H04L 63/1458 |
| | | | 726/3 |
| 2016/0301766 A1* | 10/2016 | Ionescu | H04L 29/08 |
| 2017/0257453 A1* | 9/2017 | McMullen | H04L 63/102 |
| 2018/0077222 A1* | 3/2018 | Shnitko | H04L 65/4084 |
| 2019/0004969 A1* | 1/2019 | Orogvany | G06F 3/067 |
| 2019/0114582 A1* | 4/2019 | Nishikawa | G06Q 10/0832 |
| 2019/0158621 A1* | 5/2019 | Trichias | H04L 67/2852 |
| 2020/0028933 A1* | 1/2020 | Li | H04L 67/32 |

OTHER PUBLICATIONS

International Search Report dated Jan. 31, 2019 for corresponding International Application No. PCT/FR2018/053330, filed Dec. 17, 2018.
Written Opinion of the International Searching Authority dated Jan. 31, 2019 for corresponding International Application No. PCT/FR2018/053330, filed Dec. 17, 2018.

* cited by examiner

METHOD FOR DISTRIBUTING A CONTENT IN A CONTENT DISTRIBUTION NETWORK, ENTITY OF ORIGIN AND CORRESPONDING DISTRIBUTION ENTITIES

CROSS-REFERENCE TO RELATED APPLICATIONS

This Application is a Section 371 National Stage Application of International Application No. PCT/FR2018/053330, filed Dec. 17, 2018, which is incorporated by reference in its entirety and published as WO 2019/122652 A1 on Jun. 27, 2019, not in English.

TECHNICAL FIELD

The technical field is that of the content distribution networks or content delivery networks (CDN).

More specifically, the invention relates to a method of distribution, by a distribution entity comprised in a content delivery network (CDN), of a content made available by an entity of origin.

TECHNOLOGICAL BACKGROUND

It is known for an operator to use content distribution networks to distribute contents in a communications network. Generally, these networks comprise entities of origin and distribution entities. The entities of origin make available contents that are duplicated, for example depending on their popularity, on distribution entities that are situated close to the intended recipients or addressees of these contents. The distribution entities thus make it possible to avoid making demands on the entities of origin and thus reduce costs of conveyance.

Content distribution networks are used today to deliver several types of services intended for final users (also called Internet users or clients) especially:
- delivery of multimedia and audiovisual contents of variable sizes depending on usages and protocols used (streaming, downloading);
- the delivery of these contents can be done with the HTTP (HyperText Transfer Protocol) or HTTPS (HyperText Transfer Protocol Secure) protocols; the latter protocol is becoming increasingly widespread and required by content providers;
- advanced functions may be necessary to provide the service with added value: securing, acceleration, optimizing and adaptation of contents, etc.

The services (and the associated contents) are defined by content providers and implemented, to the extent possible, by the operators of content distribution networks (here below called CDN operators) via the application of specific configurations for each content distribution network. The implementing of a service is in fact limited to a "content provider-CDN operator" pair. In other words, to implement (carry out) a function of a defined service by a content provider, each CDN operator must apply, in his content distribution network (or more precisely in the distribution entities called "cache servers"), a specific configuration (i.e. a configuration different from one CDN operator to another) and a static configuration (it is stored in each cache server) which defines the parameters of use of this function.

The question arises of the scalability and the geographical coverage of the final users (also called client entities) by a content distribution network. To increase the geographical coverage of its network and its efficiency, the CDN operator currently has two options:
1) deploy new cache servers in non-covered geographical zones (this can imply having to deploy these cache servers in the networks of Internet operators in order to make the content distribution network more efficient; this is the option chosen by major actors such as a Akamai, Google or Facebook);
2) interconnect its content distribution network with that of a third-party CDN operator.

Option 1) enables the CDN operator to keep full control over the services that he delivers and the functions offered. However, this requires massive deployments of cache servers, demanding heavy investments and major operating and maintenance costs (hosting, network bandwidth, energy, updating, replacement of hardware).

Option 2) enables the sharing of costs and revenue among CDN operators involved. However, the widespread use of the interconnection of content distribution networks comes up against the diversity of the CDN technologies used by CDN operators. An interconnection between two content distribution networks is possible only if their functional coverages are identical. And even if this is the case, the implementing of the service is not easy because it necessitates the setting up of a specific and static configuration (see discussion further above) on each of the two content distribution networks involved. This configuration process, which is not easy, can be manual or automated, for example via application programming interfaces (APIs). Should one of the two content distribution networks be unable to provide one of the functions of the service, the interconnection between the two content distribution networks is quite simply impossible.

In short, it is not easy for a CDN operator to dynamically interconnect his content distribution network with another content distribution network in order to extend the geographical coverage of a service.

The question of the functional coverage of a content distribution network also arises. Indeed, should a content distribution network be unable to provide one of the functions of a service, the CDN operator of this network cannot be called upon by the content provider to implement this service.

One of the aims of the present invention is to overcome the inadequacies/drawbacks of the prior art described here above and/or to bring improvements thereto.

SUMMARY

One particular embodiment of the invention proposes a method of distribution, by a first distribution entity comprised in a first content distribution network, of a content made available by an entity of origin, the method comprising the following steps implemented by said first distribution entity:
- receiving a request for access to the content coming from a client entity;
- if the request for access is a first request for access received by the first distribution entity for said content:
  - acting as a proxy: resending the request for access to the entity of origin or to a second distribution entity comprised in a second content distribution network, receiving, in return, and retransmitting to the client entity, a response comprising the content, and storing the content in a cache; and transmitting a request for context to the entity of origin or to the second distribution entity and then receiving, in return, a response comprising a description of an execution context of the request for access, and storing said description;

if the request for access is not said first request for access but a subsequent request for access, using the previously stored description in order to carry out an execution of said subsequent request for access.

Thus, this particular embodiment of the invention relies on a wholly novel and inventive approach consisting of a dynamic implementation, on the first distribution entity (cache server) of the first content distribution network (first CDN) of a description of an execution context of a request of access to a content. Indeed, this description is received and stored by the first distribution entity (following the reception of the first request for access) which could thus use it to process (execute) a subsequent request for the same content. This description describes one or more functions (of a service provided by a content provider) as well as a configuration which defines the parameters of use of this function or these functions.

The proposed solution therefore enables the dynamic implementation, on the first distribution entity, of one or more functions that are unavailable natively on the first content distribution network.

Should the description be provided by the entity of origin, the proposed solution enables the CDN operator of the first content distribution network to be subjected to demands from the content provider for the implementing of a service whereas the first distribution entity of this first network does not natively have available any function or functions of this service. In this way, this CDN operator improves the functional coverage of his content distribution network. This also enables the provider to avoid having to deploy his own servers with the associated costs.

Should the description be provided by the second distribution entity, the proposed solution enables the CDN operator of the second content distribution network to extend his geographical coverage by relying on the first content distribution network. In other words, this solution mitigates the limitations of the known solution for the interconnection of content distribution networks, related to the functional differences between networks (the proposed solution does not necessitate the setting up of a specific and static configuration on each of the two content distribution networks involved in the interconnection).

According to one particular characteristic, the description of the execution context of the request for access comprises:

a description of a scope of said execution context enabling said execution context to be identified from said subsequent request for access; and a code for processing said subsequent request for access.

According to one particular characteristic, the description of the execution context of the request for access further comprises an initializing code for initializing said context. The method further comprises the following step implemented by the first distribution entity, if the request for access is said first request for access: execution of said initializing code in order to initialize a configuration of execution of said subsequent request for access.

According to one particular characteristic, said processing code comprises a request authorizing code, enabling the first distribution entity, in said step of use, to determine, from at least one element of said subsequent request for access, whether or not said client entity is authorized to receive the content.

According to one particular characteristic, said processing code comprises a content identification code enabling the first distribution entity in said step of use to compute, from at least one element of said subsequent request for access, a single content identifier with which the first distribution entity will identify the content in the cache.

According to one particular characteristic, the processing code comprises a content generation code enabling the first distribution entity, in said step of use, if the content is not available and valid in the cache, to generate or search for the content from at least one element of said subsequent request for access, and to store the content in the cache.

According to one particular characteristic, said processing code comprises a start-of-delivery code, enabling the first distribution entity in said step of use to send at least one piece of information on start of delivery, to a first other entity, before transmission of the content to the client entity.

According to one particular characteristic, said processing code comprises an end-of-delivery code enabling the first distribution entity, in said step of use, to send at least one piece of information on end of delivery, to said first other entity or a second other entity, after transmission of the content to the client entity.

According to one particular characteristic, an execution of said processing code by the first distribution entity, in said step of use, is carried out under at least one condition of limitation of access to said content and/or limitation of consumption of said content.

Another embodiment of the invention proposes a method of distribution, by a first distribution entity comprised in a first content distribution network, of a content made available by an entity of origin, the method comprising the following steps implemented by the entity of origin or a second distribution entity comprised in a second content distribution network:

receiving a request for context coming from said first distribution entity; and sending a response to said first distribution entity, said response comprising a description of an execution context of a request for access to said content coming from said client entity.

Another embodiment of the invention proposes a first content distribution entity comprised in a first content distribution network and configured for a distribution of a content made available by an entity of origin, said first distribution entity comprising:

means for receiving a request for access to the content coming from a client entity;

means activated if the request for access is a first request for access received by the first distribution entity for said content, and configured to:

act as a proxy in carrying out: a retransmission of the request for access to the entity of origin or to a second distribution entity comprised in a second content distribution network, a reception in return and a retransmission, to the client entity, of a response comprising the content, and a storage of the content in a cache; and transmit a request for context to the entity of origin or to the second distribution entity and then receive in return a response comprising a description of a execution context of the request for access, and store said description;

means, activated if the request for access is not said first request for access but a subsequent request for access, and configured to use the previously stored description in order to carry out an execution of said subsequent request for access.

Another embodiment of the invention proposes an entity of origin comprised in the second content distribution network and comprising:
  means for receiving a request for context coming from a first distribution entity comprised in a first content distribution network and configured for a distribution of a content made available by said entity of origin; and
  means for sending a response to said first distribution entity, said response comprising a description of an execution context of a request for access to said content coming from a client entity.

Another embodiment of the invention proposes a second distribution entity, comprised in a second content distribution network and comprising:
  means for receiving a request for context coming from a first distribution entity comprised in a first content distribution network and configured for a distribution of a content made available by an entity of origin; and
  means for sending a response to said first entity of distribution, said response comprising a description of an execution context of a request for access to said content coming from a client entity.

Another embodiment of the invention proposes a computer program product that comprises program code instructions for the implementing of the method executed by the first distribution entity (in any one of its different embodiments), when the program is executed on a computer.

Another embodiment of the invention proposes a computer program product that comprises program code instructions for the implementing of the method executed by the entity of origin or the second distribution entity (in any one of its different embodiments) when the program is executed on a computer.

LIST OF FIGURES

Other features and advantages of the invention shall appear from the following description, given by way of an indicative and non-exhaustive example and from the appended drawings of which:

FIGS. 2 to 4 illustrate a first implementation of the methods of FIGS. 1A and 1B in which the first distribution entity interacts with the entity of origin:

DETAILED DESCRIPTION

In all the figures of the present document, the identical elements and steps are designated by a same numerical reference.

Figures 1A, 1B, 6:
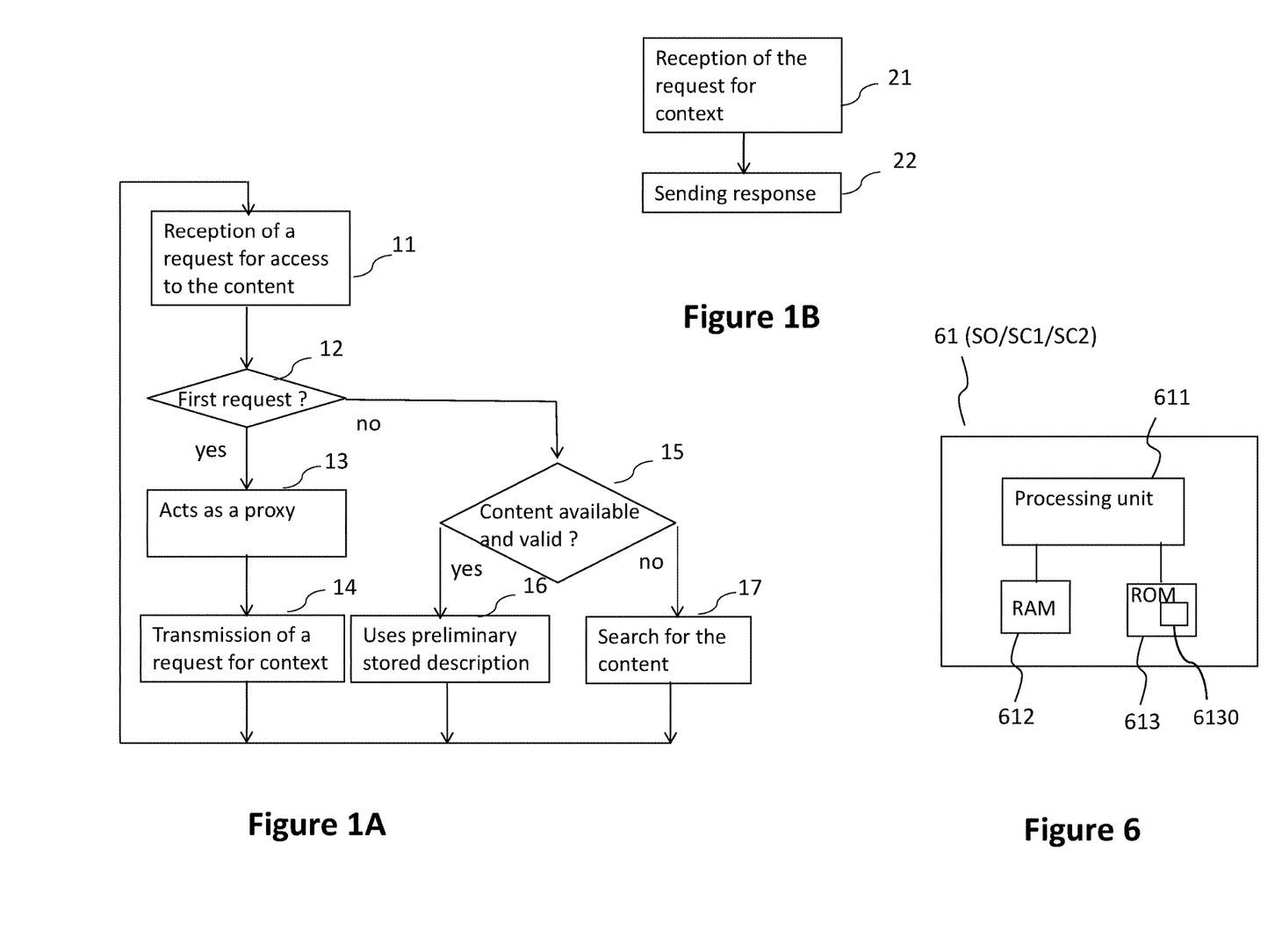
FIGS. 1A and 1B present flowcharts illustrating the methods implemented by a first distribution entity (FIG. 1A) and an entity of origin or a second distribution entity (FIG. 1B) in one particular embodiment of the invention.
FIG. 6 presents the structure of an entity that can be an entity of origin or a distribution entity (of a first or second content distribution network), according to one particular embodiment of the invention.

Referring now to FIG. 1A, we present a method of distribution of a content, implemented by a first distribution entity, in one particular embodiment of the invention.

It is assumed that the first distribution entity is comprised in a first content distribution network and that the content is made available by an entity of origin.

In a step 11, the first distribution entity receives a request, coming from a client entity, for access to the content.

In a first test step 12, the first entity determines whether this is a first request for access received by the first distribution entity for this content.

In the event of a positive response at the first test step 12 (i.e. if it is a first request for access), the first distribution entity carries out the steps 13 and 14 and then returns to the step 11 to process a new request for access.

In the step 13, the first distribution entity acts as a proxy:
  it re-sends the request for access to the entity of origin or to a second distribution entity comprised in a second content distribution network;
  it receives in return a response comprising the content;
  it re-transmits this response to the client entity; and
  it stores the content in a cache.

In the step 14, the first distribution entity transmits a request for context to the entity of origin or to the second distribution entity; and then in return receives a response comprising a description of an execution context of the request for access; finally it stores this description.

In the event of a negative response to the first test step 12 (i.e. if it is not a first request for access but a subsequent request for access), the first distribution entity carries out a first test step 15 in which it determines whether the content is available and valid in its cache.

In the event of a positive response at the second test step 15 (i.e. if the content is available and valid in its cache), the first distribution entity carries out the step 16 and then returns to the step 11 to process a new request for access. At the step 16, the first distribution entity uses the preliminarily stored description (cf. step 14) to carry out an execution of the subsequent request for access (i.e. to deliver the content to the client entity).

In the case of a negative response to the second test step 15 (i.e. if the content is not "available and valid" in its cache), the first distribution entity carries out the step 17 and then returns to the step 11 to process a new request for access. At the step 17, the first distribution entity generates or makes a search (with the entity of origin or with the second distribution entity) for the content on the basis of at least one element of the subsequent request for access.

As illustrated in FIG. 1B, the method implemented by the entity of origin or the second distribution entity (and therefore complementary to the method described in FIG. 1A for the first distribution entity) comprises:
  a step 21 of reception of the request for context coming from the first distribution entity; and
  a step 22 for sending, to the first distribution entity, the response comprising the description of the execution context of a request for access to the content.

First Implementation

Figure 2:
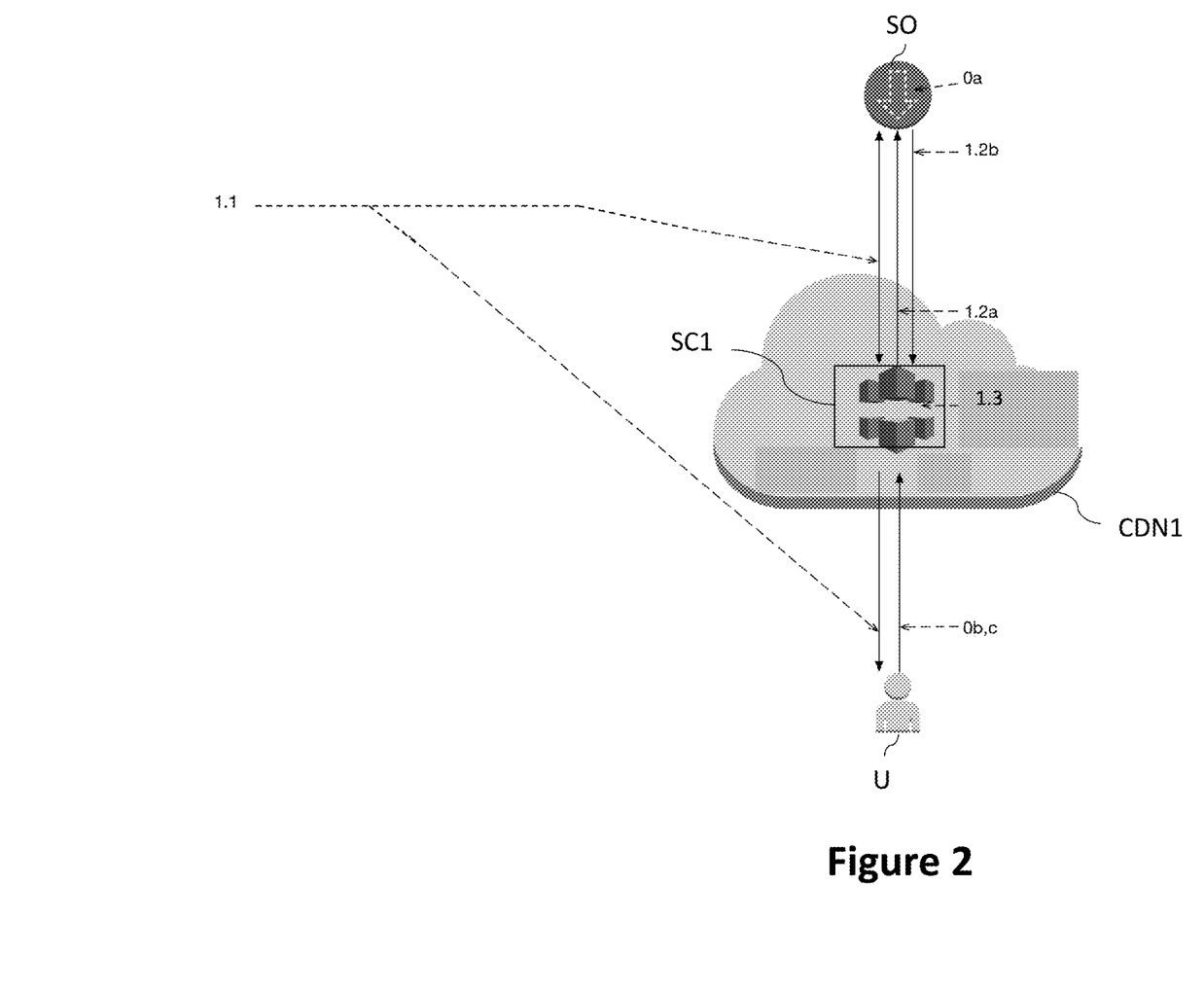
FIG. 2 gives a detailed description of the processing of the first request for access.
Figure 3:
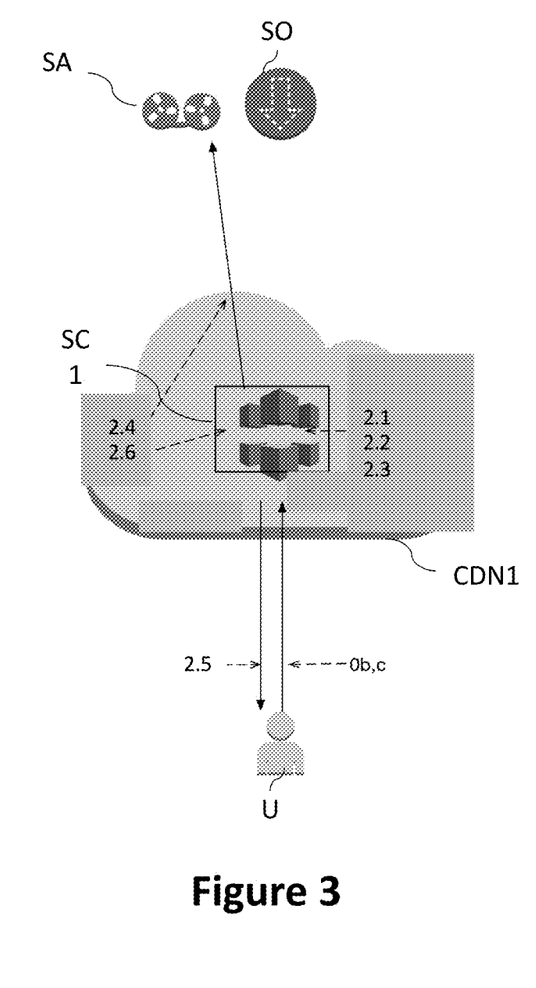
FIG. 3 gives a detailed description of the processing of a subsequent request for access when the content is cached.
Figure 4:
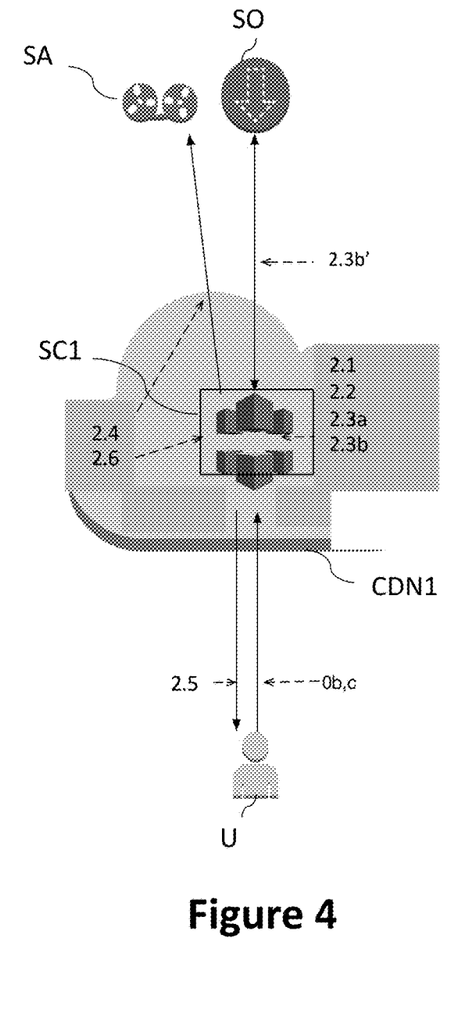
FIG. 4 gives a detailed description of the processing of a subsequent request for access, when the content is not cached.

Referring now to FIGS. 2 to 4, we present a first implementation of the methods of FIGS. 1A and 1B in which the first distribution entity SC1 (here below also called "first cache server") interacts with the entity of origin SO (also called here below "server of origin"). The first distribution entity SC1 belongs, like other distribution entities (other cache servers) to a first content distribution network referenced CDN1.

By way of an illustrative example and as symbolized by the arrow referenced 0a, it is assumed that a content provider proposing the site www.site.com uses the first content distribution network CDN1 to deliver its contents. It sets up the server of origin SO that the cache servers of the first network CDN1 (especially the first cache server SC1) will approach in order to obtain the resources to be delivered. For each content (or group of contents), the server of origin SO stores a description of an execution context of the request for access to this content or these contents.

It is also assumed, as symbolized by the arrow referenced 0b,c, that a client entity U wishes to access a content that is a resource situated on the site www.site.com and the URL address of which is http(s)://www.site.com/resource. To this end, the client entity U transmits a request for access to the desired content. This request for access is directed towards the first cache server SC1 by a means well known to those skilled in the art and outside the scope of the present solution.

FIG. 2 gives a detailed description of the processing by the first cache server SC1 of the request for access transmitted by the client entity U when it is a first request for access to this content (cf. steps 13 and 14 of FIG. 1A). In this case, the content is not cached in the first cache server SC.

At a step 1.1, to prevent any latency relative to the client entity U for this first request for access to this content (resource), the first cache server SC1 acts as a simple proxy (for example according to the TCP or HTTP protocol):
  it re-sends the first request for access transparently to the server of origin SO (the method of re-routing the first request of access to the server of origin is outside the scope of the present solution);
  it receives in return a response comprising the content;
  it re-transmits the response to the client entity U, which thus obtains the requested resource; and
  it stores the content in a cache.

In a step 1.2a, carried out for example at the same time as the step 1.1, the first cache server SC1 sends out a request for context to the server of origin SO in order to obtain a description of an execution context of the request for access (cf. further above the discussion on the arrow referenced 0a).

In a step 1.2b, the first cache server SC1 receives, in response, a description of an execution context of the request for access and stores this description.

In a particular implementation, this description of the execution context comprises:
  a description of a scope of the execution context: it thereafter enables the execution context to be identified from a subsequent request for access. Indeed, the same execution context can be applied to different requests for access. The scope of the context is defined for example in listing the URLs concerned (regular list and/or expressions corresponding to several URLs) as well as in specifying a lifetime of the context (making it possible to renew the URLs listed at the expiry of this lifetime);
  a code for initializing the context: a code of which the execution is used to initialize a configuration of execution of a subsequent request for access. Should it be necessary to have a comprehensive configuration for the context, or a configuration that is common to several contexts, the initialization code enables it to be initialized. This can relate to a configuration linked to the content provider (limits in terms of usable resources, setting up of an HTTPS certificate, configuration of parameters used by the processing codes, etc.); and
  a code for processing a subsequent request for access: a code, the execution of which enables the processing of the request in the different processing phases. This code itself comprises several codes (also called sub-codes):
    a request authorization code: a code enabling the authorizing or non-authorizing of the first cache server SC1 to process a subsequent request for access. A subsequent execution of this code enables a first cache server SC1, on the basis of at least one element of a subsequent request for access (for example the URL of the content and the IP address of the client entity) to determine whether or not the client entity is authorized to receive the content;
    a content identification code: a code making it possible, on the basis of one or more elements of the first request for access (URL of the content, headers, IP address, etc.) to compute a unique content identifier with which the present cache server SC1 will identify the content in the cache;
    a content generation code: a code making it possible, if the content is not "available and valid" in the cache, to generate it from one or more elements of the first request for access (URL of the content, headers, IP address, etc.). It is possible to envisage searching for the content in the server of origin SO or to generate a new content that is more suited (for example with one of the following techniques: transcoding of images or videos, transpackaging, adaptation of HTML/javascript code, etc.);
    a start-of-delivery code: code executed at the beginning of the delivery of the content, for example to enable the sending of one or more pieces of information on the start of delivery to at least one first device of the content provider (for example the sending of tracking information (log information, accounting information, etc.) to an analysis server), before transmission of the contents to the client entity U;
    an end-of-delivery code: a code executed at the end of the delivery of the content, for example to enable the sending of one or more pieces of information on the end of delivery to at least one second device of the content provider, for example the sending of information on the status of the delivery (end, errors, etc.) to an analysis server (the same as the one already mentioned or another), after transmission of the content to the client entity U. These pieces of information on status are for example used to count the number of active sessions for a content and for a user. The number of active sessions is for example used as an input parameter by the request authorization code, which compares it with a threshold value (maximum number of active sessions);
    . . . (it is possible to envisage other types of codes for other processing phases not listed here).

The codes mentioned here above can take several forms: scripts (python, php, etc.), byte-code (compiled programming languages independent of the execution architecture, e.g. LUA), binary forms (compiled programming languages dependent on the architecture, e.g. the language C), etc.

For reasons of performance and security, the execution of these codes is done, in one particular implementation, in conditions where the access and the consumption of resources (contents) are limited (i.e. under at least one condition of limitation of access to the content and/or limitation of consumption of the content) but adaptable (depending on the client entity, the content provider, a priority level, etc.).

It is also possible to envisage the execution of the codes in containers (docker, lxc, rocket, etc.), or even to envisage that the codes will be provided directly in the form of containers executed with limitations of resources.

In a step 1.3, the first cache server SC1 executes the initialization code (received at the step 1.2*b*). This execution makes it possible for example to initialize an HTTPS configuration, with the setting up of certificates and private keys needed for the management of the HTTPS requests.

FIG. 3 gives a detailed description of the processing, by the first cache server SC1, of the request for access transmitted by the client entity U when it is a subsequent request for access and when the content is cached (cf. step 16 FIG. 1A).

In a step 2.1, the first cache server SC1 identifies the concerned execution context (and therefore also the associated processing code, i.e. included in the same description of execution context, here below called a "selected processing code"), on the basis of the requested URL and in using the description or descriptions of scope of execution context that it has previously received and stored. It may be recalled that, for each first request for access received and processed in compliance with the method of FIG. 2, the first cache server SC1 has received and stored a description of an execution context comprising especially a description of a scope of this execution context (this description lists for example concerned URLs).

In a step 2.2, the first cache server SC1 executes the request authorization code comprised in the selected processing code. If the result of this execution is that the request for access is not authorized, the first cache server SC1 stops the processing operation. If not, it continues and passes to the step 2.3.

In the step 2.3, the first cache server SC1 executes the content identification code included in the selected processing code and then, with the unique content identifier obtained, it determines whether the content being sought is cached and valid. In the case of FIG. 3, it is assumed that the content is effectively cached and valid, and therefore the first cache server SC1 passes to the step 2.4.

In the step 2.4, the first cache server SC1 executes the start-of-delivery code (for example to send accounting information to an analysis server SA).

At the step 2.5, the first cache server delivers the content to the client entity U.

In a step 2.6, the first cache server SC1 executes the end-of-delivery code (for example to send delivery status information to the analysis server SA).

FIG. 4 provides a detailed view of the processing, by the first cache server SC1, of the request for access transmitted by the client entity U when it is a subsequent request for access and when the content N is not cached (cf. step 17 of FIG. 1A).

The steps 2.1 and 2.2 are identical to those already described for FIG. 3.

At the step 2.3*a*, as at the step 2.3 of FIG. 3, the first cache server SC1 executes the content identification code included in the selected processing code and then, with the unique content identifier obtained, determines whether the content being sought is cached and valid, and hence the first cache server SC1 passes to the step 2.3*b*.

In the step 2.3*b*, the first cache server SC1 executes the content generation code. For example, in a sub-step 2.3*b*', it will search for the content on the server of origin SO (sending a request and receiving a response with the content). Then it stores the content in a cache file.

The step 2.4, 2.5 and 2.6 are identical to those already described for FIG. 3.

Second Implementation

Figure 5:
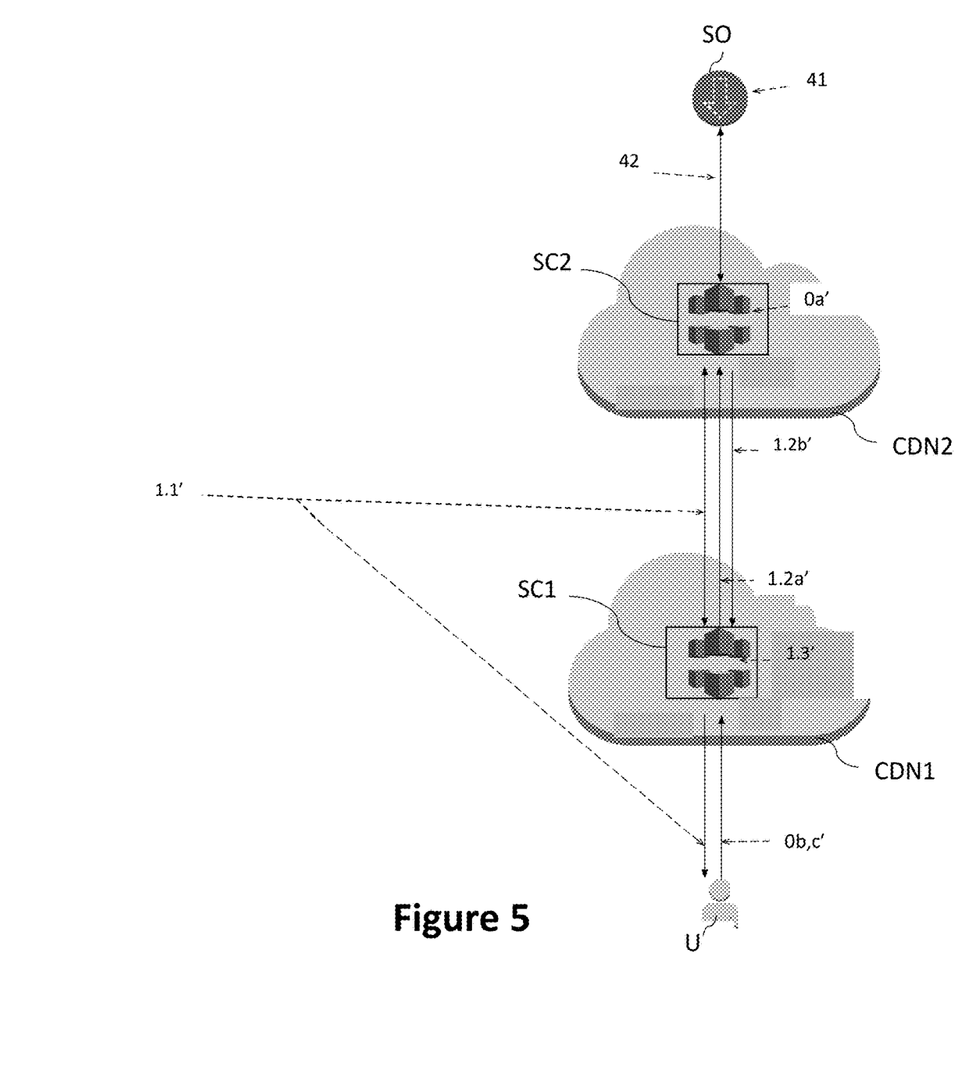
FIG. 5 gives a detailed view of the processing of a first request for access in a second implementation of the methods of FIGS. 1A and 1B wherein the first distribution entity interacts with the second distribution entity (and not with the entity of origin)

Referring now to FIG. 5, we present a second implementation of the methods of FIGS. 1A and 1B, wherein the first distribution entity SC1 (here below also called the "first cache server") interacts with the second distribution entity SC2 (here below also called "second cache server"), and not with the entity of origin SO. The second distribution entity SC2 belongs, like the other distribution entities (other cache servers), to a second content distribution network referenced CDN2.

More specifically, FIG. 5 provides a detailed description of the processing of a first request for access in the context of this second implementation.

By way of an illustrative example, and as symbolized by the arrow referenced 41, it is assumed that a content provider, proposing the site www.site.com, uses the second content distribution network CDN2 to deliver its contents. It sets up the server of origin SO, that the cache servers of this second network CDN2 (especially the second cache server SC2) will approach to obtain the resources to be delivered (as symbolized by the arrow referenced 42).

It is also assumed, as symbolized by the arrow referenced 0*a*', that the second cache server SC2 stores, for each content (or group of contents), a description of an execution context of the request for access to this content or these contents. In this second implementation, and unlike in the first implementation, the server of origin SO, for each content (or group of contents), does not store a description of a execution context of the request for access access to this content or these contents.

It is assumed finally, as symbolized by the arrow referenced 0*b,c*', that a client entity U wishes to access a content, which is a resource situated on the site www.site.com and the URL address of which is http(s)://www.site.com/resource. To this end, the client entity U transmits a request for access to the desired content. This request for access is directed towards the first cache server SC1 (of the first content distribution network CDN1), by a means well known to those skilled in the art and outside the scope of the present solution.

In this second implementation, the first cache server SC1 carries out steps 1.1', 1.2*a*', 1.2*b*' and 1.3' that are deduced directly from the steps 1.1, 1.2*a*, 1.2*b* and 1.3 already described for FIG. 2, in assuming that the second cache server SC2 of FIG. 5 herein plays the role that the server of origin SO plays in FIG. 2.

Similarly, in the second implementation:
the processing, by the first cache server SC1 of a request for access transmitted by the client entity U when it is a subsequent request for access and when the content is cached and valid (in the first cache server SC1) can be deduced directly from the steps 2.1 to 2.6 already described for FIG. 3, in assuming that the second cache server SC2 herein plays the role that the server of origin SO plays in FIG. 3;

the processing, by the first cache server SC2 of a request for access transmitted by the client entity U when it is a subsequent request for access and when the content is not "cached and valid" (in the first cache server SC1), can be deduced directly from the steps 2.1 to 2.6 already described for FIG. 4, in assuming that the second cache server SC2 plays the role that the server of origin SO plays in FIG. 4.

Third Implementation

In a third implementation, which is a variant of the second implementation:

the server of origin SO and the second cache server SC2 implement the solution of the first implementation (see FIGS. 2 to 4) in playing respectively the role of server of origin SO and of the first cache server SC1 of the first implementation. As a consequence (since it is one of the characteristics of the first implementation), it is the server of origin SO that initially stores, for each content (or group of contents), a description of an execution context of the requests for access to this content or these contents; and the second cache server SC2 (since it plays the role of the first cache server SC1 of the first implementation) will then send out a request for context to the server of origin SO in order to obtain a description of a execution context of the request for access (see here further above the discussion related to the arrow referenced 0a in FIG. 2); and the second cache server SC2 and the first cache server SC1 implement the solution of the second implementation (see FIG. 5).

Other Implementations

Other implementations can be envisaged in cascading more than two content distribution networks. In denoting the n cascaded content distribution networks as $CDN_1$ to $CDN_n$, and the corresponding cache servers as $SC_1$ to $SC_n$, with n>2, we have a system in which:

the server of origin SO and the $n^{th}$ cache server $SC_n$ implement the solution of the first implementation (see FIGS. 2 to 4) in respectively playing the role of the server of origin SO and the first cache server SC1 of the first implementation; and each pair of cache servers ($SC_k$, $SC_{k-1}$), with k∈{n−md 1 . . . 2}, implements the solution of the second implementation (see FIG. 5).

FIG. 6 presents the structure of an entity 61 which can be the entity of origin (server of origin) SO, the first distribution entity (first cache server) SC1 or the second distribution entity (second cache server) SC2 according to one particular embodiment of the invention.

This entity comprises a live memory 612 (for example a RAM), a processing unit 611, equipped for example with a processor, and driven by a computer program stored in a read-only memory 613 (a ROM or a hard disk drive). At initialization, the code instructions of the computer program are for example loaded into the live memory 612 and then executed by the processor of the processing unit 611.

This FIG. 6 illustrates only one particular way, among several possible ways, of carrying out the different algorithms described in detail here above, with reference to FIGS. 1A, 1B and FIG. 2 to FIG. 5. Indeed, the technique of the invention can be carried out equally well:

on a reprogrammable computing machine (a PC computer, a DSP processor or a microcontroller etc.) executing a program comprising a sequence of instructions, or on a dedicated computing machine (for example a set of logic gates such as an FPGA or an ASIC or any other hardware module).

Should the invention be implanted in a reprogrammable computing machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

The invention claimed is:

1. A method of distribution, by a first distribution entity comprised in a first content distribution network, of a content made available by an entity of origin, the method being implemented by said first distribution entity and comprising:

receiving a request for access to the content coming from a client entity;

determining whether the received request for access is a first request for access received by the first distribution entity for said content or a subsequent request for access;

in response to the received request for access being the first request for access received by the first distribution entity for said content:

acting as a proxy: resending the received request for access to the entity of origin or to a second distribution entity comprised in a second content distribution network, receiving, in return, and retransmitting, to the client entity, a response comprising the content and storing the content in a cache;

transmitting a request to the entity of origin or to the second distribution entity, for obtaining a description of an execution context of the received request for access, then receiving, in return, a response comprising said description, and storing said description, wherein the description of the execution context of the received request for access comprises:

a processing code for processing said subsequent request for access wherein said processing code comprises a delivery status code, enabling the first distribution entity in said execution of said subsequent request for access to send at least one piece of information on status of delivery to a first other entity; and in response to the received request for access not being said first request for access but the subsequent request for access, using the previously stored description in order to carry out an execution of said subsequent request for access to provide the content preliminarily stored in the cache.

2. The method of distribution according to claim 1, wherein said processing code comprises a request authorizing code, enabling the first distribution entity, in said execution of said subsequent request for access, to determine, from at least one element of said subsequent request for access, whether or not said client entity is authorized to receive the content.

3. The method of distribution according to claim 1, wherein said processing code comprises a content identification code enabling the first distribution entity, in said execution of said subsequent request for access, to compute, from at least one element of said subsequent request for access, a single content identifier with which the first distribution entity will identify the content in the cache.

4. The method of distribution according to claim 1, wherein said processing code comprises a content generation code enabling the first distribution entity, in said execution of said subsequent request for access, if the content is not available and valid in the cache, to generate or search for the content from at least one element of said subsequent request for access, and to store the content in the cache.

5. The method of distribution according to claim 1, wherein said processing delivery status code comprises a start-of-delivery code and said at least one piece of information on status of delivery is a piece of information on start of delivery sent the a first other entity before transmission of the content to the client entity.

6. The method of distribution according to claim 1, wherein said delivery status code comprises an end-of-delivery code and said at least one piece of information on status of delivery is a piece of information on end of delivery sent to said first other entity or a second other entity after transmission of the content to the client entity.

7. The method of distribution according to claim 1, wherein an execution of said processing code by the first distribution entity, in said execution of said subsequent request for access, is carried out under at least one condition of limitation of access to said content and/or limitation of consumption of said content.

8. A method of distribution, by a first distribution entity comprised in a first content distribution network, of a content made available by an entity of origin, the method comprising steps implemented by the entity of origin or a second distribution entity comprised in a second content distribution network, comprising:
    receiving a request coming from said first distribution entity for obtaining a description of a context of execution of a request for access coming from a client entity; and
    sending a response to said first distribution entity, said response comprising said description of the context of execution of the request for access, which comprises:
        a processing code for processing said subsequent request for access, wherein said processing code comprises a delivery status code, enabling the first distribution entity in said execution of said subsequent request for access to send at least one piece of information on status of delivery to a first other entity.

9. A first content distribution entity comprised in a first content distribution network and configured for a distribution of a content made available by an entity of origin, said first distribution entity comprising:
    a processor; and
    a non-transitory computer-readable medium comprising instructions stored thereon which when executed by the processor configure the first content distribution entity to:
    receive a request for access to the content coming from a client entity;
    determine whether the received request for access is a first request for access received by the first distribution entity for said content or a subsequent request for access;
    in response to the received request for access being the first request for access received by the first distribution entity for said content:
        act as a proxy in carrying out: a retransmission of the received request for access to the entity of origin or to a second distribution entity comprised in a second content distribution network, a reception in return and a retransmission, to the client entity, of a response comprising the content, and a storage of the content in a cache;
    transmit a request to the entity of origin or to the second distribution entity for obtaining a description of an execution context of the received request for access, then receive in return a response comprising said description, and store said description, wherein the description of the execution context of the received request for access comprises:
        a processing code for processing said subsequent request for access, wherein said processing code comprises a delivery status code, enabling the first distribution entity in said execution of said subsequent request for access to send at least one piece of information on status of delivery to a first other entity; and
    in response to the received request for access being not said first request for access but the subsequent request for access, use the previously stored description in order to carry out an execution of said subsequent request for access to provide the content preliminarily stored in the cache.

10. A device corresponding to an entity of origin or a second distribution entity comprised in a second content distribution network, the device comprising:
    a processor; and
    a non-transitory computer-readable medium comprising instructions stored thereon which when executed by the processor configure the device to:
    receive a request for obtaining a description of an execution context of a request for access coming from a client entity, the request coming from a first distribution entity comprised in a first content distribution network and configured for a distribution of a content made available by said entity of origin; and
    send a response to said first distribution entity, said response comprising said description of the context of execution of the request for access, which comprises:
    a processing code for processing said subsequent request for access, wherein said processing code comprises a delivery status code, enabling the first distribution entity in said execution of said subsequent request for access to send at least one piece of information on status of delivery to a first other entity.

11. A non-transitory computer-readable medium comprising computer code instructions stored thereon which when executed by a processor of a first distribution entity configure the first distribution entity to implement a method of distribution, of a content made available by an entity of origin, the first distribution entity being comprised in a first content distribution network, the method comprising:
    receiving a request for access to the content coming from a client entity;
    determining whether the received request for access is a first request for access received by the first distribution entity for said content or a subsequent request for access;
    in response to the received request for access being the first request for access received by the first distribution entity for said content:
        acting as a proxy: resending the received request for access to the entity of origin or to a second distribution entity comprised in a second content distribution network, receiving, in return, and retransmitting, to the client entity, a response comprising the content and storing the content in a cache;

transmitting a request to the entity of origin or to the second distribution entity, for obtaining a description of an execution context of the received request for access, then receiving, in return, a response comprising said description, and storing said description, wherein the description of the execution context of the received request for access comprises:
  a processing code for processing said subsequent request for access wherein said processing code comprises a delivery status code, enabling the first distribution entity in said execution of said subsequent request for access to send at least one piece of information on status of delivery to a first other entity; and
in response to the received request for access not being said first request for access but the subsequent request for access, using the previously stored description in order to carry out an execution of said subsequent request for access to provide the content preliminarily stored in the cache.

12. A non-transitory computer-readable medium comprising computer code instructions stored thereon which when executed by a processor of a device, corresponding to an entity of origin or a second distribution entity in a second content distribution network, configure the device to implement a method of distributing content, comprising:
  receiving a request for obtaining a description of a context of execution of a request for access coming from a client entity, the request coming from a first distribution entity comprised in a first content distribution network and configured for a distribution of a content made available by said entity of origin; and
  sending a response to said first distribution entity, said response comprising said description of the context of execution of the request for access, which comprises:
    a processing code for processing said subsequent request for access, wherein said processing code comprises a delivery status code, enabling the first distribution entity in said execution of said subsequent request for access to send at least one piece of information on status of delivery to a first other entity.

13. The method of distribution according to claim 1, wherein the description of the execution context of the request for access comprises:
  a description of a scope of said execution context enabling said execution context to be identified from said subsequent request for access.

14. The method of distribution according to claim 13, wherein the description of the execution context of the request for access further comprises an initializing code for initializing said context, and wherein the method further comprises the first distribution entity, in response to the request for access being said first request for access:
  executing said initializing code in order to initialize a configuration of execution of said subsequent request for access.

* * * * *